Patented Feb. 28, 1933

1,899,377

UNITED STATES PATENT OFFICE

KARL ZAHN AND HEINRICH KOCH, OF FRANKFORT-ON-THE-MAIN-HOCHST, AND KLAUS WEINAND, OF LEVERKUSEN-I. G. WERK, GERMANY, ASSIGNORS TO GENERAL ANILINE WORKS, INC., OF NEW YORK, N. Y., A CORPORATION OF DELAWARE

NEW ACID DYESTUFFS OF THE ANTHRAQUINONE SERIES

No Drawing. Application filed February 3, 1932, Serial No. 590,783, and in Germany April 16, 1931.

The present invention relates to new acid dyestuffs of the anthraquinone series, more particularly it relates to new compounds of the general formula:

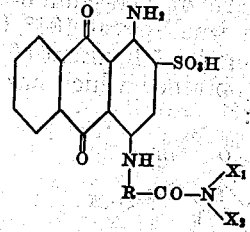

wherein R stands for a radical of the benzene series, $X_1$ for hydrogen, alkyl, hydroxyalkyl or cyclohexyl and $X_2$ for hydrogen, or $X_1$ and $X_2$ represent alkyl radicals.

Our new dyestuffs are obtainable by causing 1-amino-4-halogen-anthraquinone-2-sulfonic acid or a salt thereof to react with a compound of the general formula:

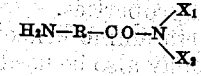

wherein R, $X_1$ and $X_2$ are identified as above.

The condensation of the said components is preferably effected by heating them in the presence of water, an acid binding agent, such as sodium carbonate or sodium bicarbonate, and a small quantity of a catalytically acting substance, such as cuprous chloride, copper sulfate or the like.

The new dyestuffs are distinguished by clear tints and good fastness properties. They dye the animal fiber from an acid bath blue tints.

The following examples serve to illustrate the invention, but they are not intended to limit it thereto, the parts being by weight:

(1) 10 parts of sodium salt of 1-amino-4-bromo-anthraquinone-2-sulfonic acid, 5.5 parts of meta-aminobenzamide, 2 parts of sodium carbonate, 0.5 parts of cuprous chloride are slowly heated in 60 parts of water to 70° C.–80° C., while stirring. The temperature is maintained until the formation of the dyestuff is finished. The dyestuff is salted out by means of sodium chloride and purified by repeatedly redissolving it in water and again salted out. The product obtained forms a blue powder which dyes wool from an acid bath clear blue tints of good fastness properties. The dyestuff has the following structural formula:

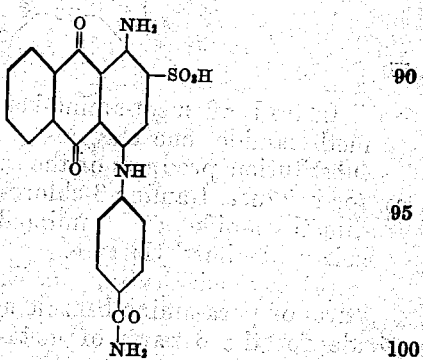

By using instead of meta-aminobenzamide, 1-amino-3-chloro-5-benzamide or 1-amino-4-chloro-5-benzamide, dyestuffs having similar properties are obtained.

(2) 10 parts of the sodium salt of 1-amino-4-bromo-anthraquinone-2-sulfonic acid, 5.5 parts of para-aminobenzamide, 5 parts of potassium carbonate, 0.5 part of cuprous chloride are heated in 80 parts of water at 80° C.–90° C. The dyestuff is worked up as described in Example 1. It dyes wool from an acid bath violet-blue tints and corresponds to the following formula:

(3) 10 parts of the sodium salt of 1-amino-4-bromo-anthraquinone-2-sulfonic acid, 6 parts of meta-aminobenzoic acid cyclohexylamide, 2 parts of sodium carbonate, 0.5 part of cuprous chloride are heated in 80 parts of water and 20 parts of methyl alcohol at 90° C.–100° C. The dyestuff is isolated and purified; it forms a blue powder and dyes wool from an acid bath clear blue tints. It has the following formula:

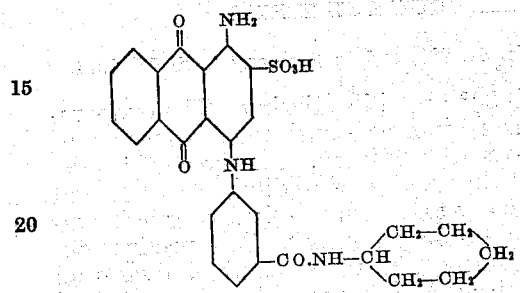

Instead of meta-amino-benzoic acid cyclohexylamide used in this example, there may be used in an analogous manner para-amino-benzoic acid cyclohexylamide or ortho-amino-benzoic acid cyclohexylamide.

(4) 10 parts of the sodium salt of 1-amino-4-bromo-anthraquinone-2-sulfonic acid are heated with 6 parts of meta-aminobenzoic acid dimethylamide, 2 parts of sodium carbonate, 0.5 part of cuprous chloride and 60 parts of water for 8 hours at 65° C.–70° C., while stirring. The dyestuff precipitates in the form of blue crystals and is purified by washing with sodium chloride solution and redissolving. It dyes wool from an acid bath reddish-blue tints. It has the following formula:

Instead of meta-amino-benzoic acid dimethylamide, one may also use the chloro-substitution products of the said compound, for instance, 1-amino-3-chloro-5-benzoic acid dimethylamide or 1-amino-4-chloro-5-benzoic acid dimethylamide.

(5) By substituting in Example (4) 6 parts of para-amino-benzoic acid methylamide for the 6 parts of meta-amino-benzoic acid dimethylamide, a blue dyestuff is obtained which has the following formula:

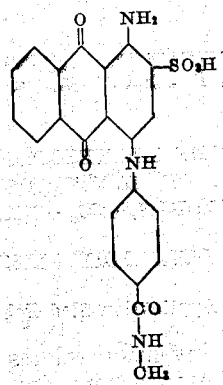

The dyestuff dyes wool clear blue tints.

(6) By replacing in Example (4) the 6 parts of meta-amino-benzoic acid dimethylamide by 7 parts of meta-amino-benzoic acid ethanolamide (melting at 104° C.–105° C.) and by heating for 5 hours at 60° C.–70° C., a dyestuff is obtained which has the following formula:

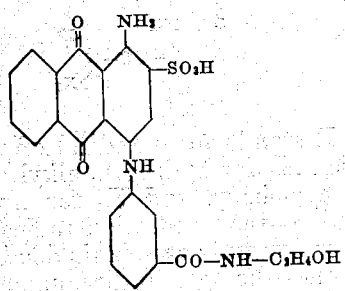

The dyestuff is separated from the reaction mixture by salting out; it forms in the dry state a blue powder and dyes wool blue tints of good fastness properties.

Instead of meta-amino-benzoic acid ethanolamide, there may also be used the ortho- or para-compound of the said amide.

(7) 10 parts of the sodium salt of 1-amino-4-bromo-anthraquinone-2-sulfonic acid are heated for several hours at 70° C.–75° C. with 6 parts of ortho-aminobenzamide, 2 parts of sodium carbonate, 2 parts of sodium bicarbonate, 0.5 part of cuprous chloride and 70 parts of water. The dyestuff separates in the form of crystals having a bronze-like luster. It dyes wool from an acid bath clear blue tints. It corresponds to the following formula:

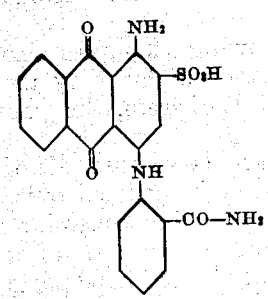

Dyestuffs having properties similar to those of the dyestuffs described in the before-mentioned examples are obtained by using components which are analogous to those disclosed in the specific examples, such as ortho-, meta- and para-amino-benzoic acid mono- and diethylamides or nuclear substitution products thereof, as for instance, the chloro-substitution products thereof.

We claim:

1. As new products, acid dyestuffs dyeing animal fiber from an acid bath blue tints and corresponding to the general formula:

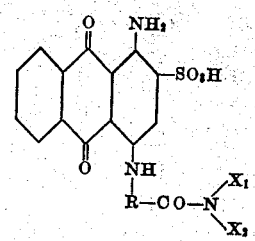
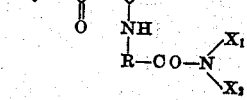

wherein R stands for a radical of the benzene series, $X_1$ for hydrogen, alkyl, hydroxyalkyl or cyclohexyl and $X_2$ for hydrogen, or $X_1$ and $X_2$ represent alkyl radicals.

2. As new products, acid dyestuffs dyeing animal fiber from an acid bath blue tints and corresponding to the general formula:

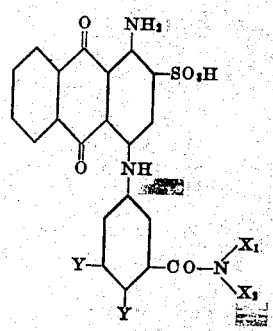
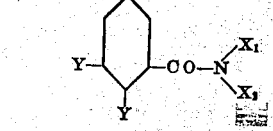

wherein $X_1$ stands for hydrogen, alkyl, hydroxyalkyl or cyclohexyl and $X_2$ for hydrogen, or $X_1$ and $X_2$ represent alkyl radicals, and the Y's mean hydrogen or one Y chlorine.

3. As a new product, the acid dyestuff dyeing animal fiber from an acid bath clear blue tints of good fastness properties and corresponding to the formula:

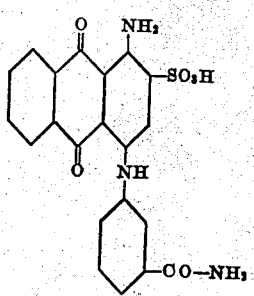
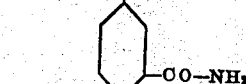

4. As a new product, the acid dyestuff dyeing animal fiber from an acid bath clear blue tints of good fastness properties and corresponding to the formula:

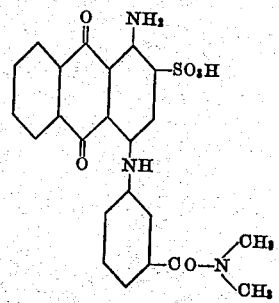

5. As a new product, the acid dyestuff dyeing animal fiber from an acid bath clear blue tints of good fastness properties and corresponding to the formula:

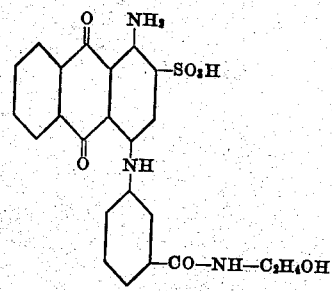

In testimony whereof, we affix our signatures.

KARL ZAHN.
HEINRICH KOCH.
KLAUS WEINAND.